United States Patent [19]

Matsumoto et al.

[11] Patent Number: 4,858,570
[45] Date of Patent: Aug. 22, 1989

[54] V-TYPE ENGINE

[75] Inventors: Hiroyouki Matsumoto; Kazumi Okamura; Hideo Nakayama; Yasuhiro Okasako, all of Hiroshima, Japan

[73] Assignee: Mazda Motor Corporation, Hiroshima, Japan

[21] Appl. No.: 259,253

[22] Filed: Oct. 18, 1988

[30] Foreign Application Priority Data

Oct. 19, 1987 [JP] Japan .................. 62-263357

[51] Int. Cl.4 .............................. F02B 75/18
[52] U.S. Cl. .................. 123/52 M V; 123/52 M L
[58] Field of Search ...... 123/52 M, 52 M B, 52 M C, 123/52 M L, 52 M V, 306

[56] References Cited

U.S. PATENT DOCUMENTS

| 4,440,120 | 4/1984 | Butler | 123/52 M V |
| 4,577,596 | 3/1986 | Senga | 123/52 M V |
| 4,649,871 | 3/1987 | Hatamura et al. | 123/52 M V |
| 4,708,097 | 11/1987 | Hatamura et al. | 123/52 M V |
| 4,736,714 | 4/1988 | Hokazono et al. | 123/52 M |
| 4,766,853 | 8/1988 | Iwanami | 123/52 M |

FOREIGN PATENT DOCUMENTS

| 56-52522 | 5/1981 | Japan . | |
| 0185954 | 10/1983 | Japan | 123/52 M B |
| 60-14169 | 4/1985 | Japan . | |
| 0048922 | 3/1987 | Japan | 123/52 M |

Primary Examiner—David A. Okonsky
Attorney, Agent, or Firm—Gerald J. Ferguson, Jr.

[57] ABSTRACT

In a V-type engine, the cylinders in one of the cylinder banks are connected to a first communicating passage and the cylinders in the other cylinder bank are connected to a second communicating passage. The cylinders in each cylinder bank do not fire one after another. First and second intake air supply passages are connected to the first and second communicating passages at positions near one end of the communicating passages and extend toward the respective other ends of the communicating passages just above the communicating passages.

8 Claims, 3 Drawing Sheets

V-TYPE ENGINE

BACKGROUND OF THE INVENTION

1. Field of the Invention

This invention relates to an intake system for a V-type engine, and more particularly to an intake system for a V-type engine which is arranged for supercharing by the kinetic effect of intake air.

2. Description of the Prior Art

Various multiple-cylinder engines are known which are arranged to increase the volumetric efficiency, and thereby the engine output torque, by the kinetic effect of intake air. For example, in the multiple-cylinder engine disclosed in Japanese Pat. Publication No. 60(1985)-14169, the cylinders are divided into first and second cylinder groups so that the cylinders in each cylinder group do not fire one after another, and the cylinders in the first and second cylinder groups are respectively connected to first and second intake passages, each of which comprises an enlarged volume chamber to which discrete intake passages are connected at the upstream side ends, and a resonance intake passage connected to the enlarged volume chamber. The upstream end of each resonance intake passage is communicated with an upstream side junction, and the enlarged volume chamber is provided with a switching means for selectively bringing the first and second intake passages into communication with each other or interrupting communication therebetween. When communication between the first and second intake passages is interrupted, negative pressure waves generated by the intake strokes in each cylinder are reflected at the upstream side junction as positive pressure waves, and an inertia supercharging effect is obtained by the positive pressure waves at relatively low engine speed ranges. On the other hand, when the first and second intake passages are communicated with each other, the negative pressures are reflected nearer the intake port than when communication between the intake passages is interrupted, whereby the natural frequency of the intake pressure oscillation is increased, and an inertia supercharging effect is obtained at higher engine speed ranges.

Further, supercharging can be effected by a resonance tuning effect by connecting the cylinders in each cylinder group (the cylinders which do not fire one after another) to an intake passage which has having no enlarged volume chamber, like a surge tank, and by selecting the length of the intake passage so that the resonant frequency of the intake air in the intake passage conforms to a particular engine speed range.

Based on the concepts used in such conventional intake systems, it would be expected to supercharge a V-type engine by the resonance effect of intake air by arranging the firing order so that the cylinders in each cylinder bank do not fire one after another, by communicating the cylinders in each cylinder bank by way of a resonance communicating passage and by connecting the resonance communicating passages for the respective cylinder banks to an intake air supply passage so that intake air resonates in the resonance communicating passages and the intake air supply passage.

The frequency of oscillation of the intake air depends upon the effective length of the intake passage. In order to obtain a sufficient supercharging effect by the kinetic effect of the intake air at low engine speed ranges, the intake passage must be long. However, the size of the intake system of an engine carried by a vehicle is naturally limited by the space allotted to the engine.

SUMMARY OF THE INVENTION

In view of the foregoing observations and description, the primary object of the present invention is to provide an intake system for a V-type engine in which an intake passage of a length sufficient to obtain an excellent supercharging effect by the kinetic effect of intake air at low engine speed ranges can be provided without substantially adding to the overall size of the engine.

In the intake system of the present invention, the cylinders in one of the cylinder banks are connected to a first communicating passage and the cylinders in the other cylinder bank are connected to a second communicating passage. The cylinders in each cylinder bank do not fire one after another. First and second intake air supply passages are connected to the first and second communicating passages at positions near one end of the communicating passages and extend toward the other end of the communicating passages.

With this arrangement, the overall size of the intake system can be minimized for the effective length of the intake passages for the respective cylinder banks since the first and second intake air supply passages extend in a folded fashion over the first and second communicating passages. Accordingly, the effective length of the intake passage can be made longer and the supercharging effect by the kinetic effect of intake air can be obtained at low engine speed ranges without substantially increasing the overall size of the intake system.

DESCRIPTION OF THE PREFERRED EMBODIMENTS

Figure 1:
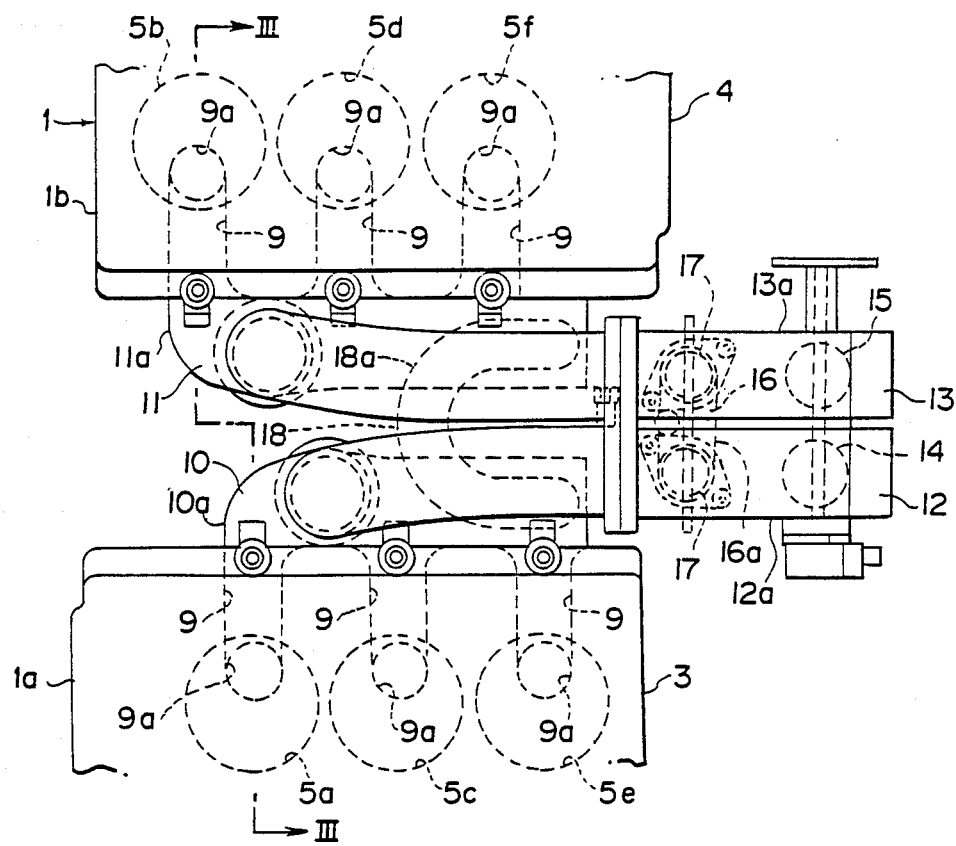
FIG. 1 is a schematic view showing a V-6 engine provided with an intake system in accordance with an embodiment of the present invention.
Figure 2:
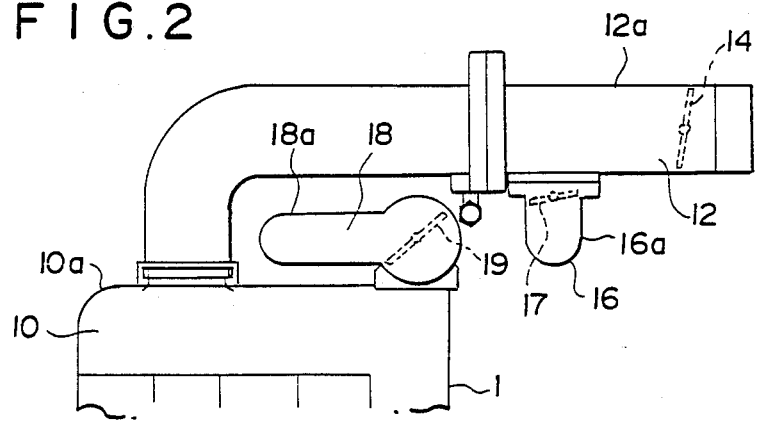
FIG. 2 is a side view of the engine.

FIGS. 1 to 4, a V-6 engine 1 comprises a cylinder block 2 and left and right cylinder heads 3 and 4 mounted on the cylinder block 2 to form left and right cylinder banks $1a$ and $1b$. The V-6 engine 1 is provided with a fuel injection system. The engine 1 has No.1 to No.6 cylinders $5a$ to $5f$ which respectively fire in this order. No.1, No.3 and No.5 cylinders $5a$, $5c$ and $5e$ are formed in the left cylinder bank $1a$ from the front (the left side as seen in FIGS. 1 and 2) to the rear, and No.2, No.4 and No.6 cylinders $5b$, $5d$ and $5f$ are formed in the right cylinder bank $1b$ from the front to the rear. That is, the cylinders in each cylinder bank do not fire one after another.

The cylinders $5a$ to $5f$ are connected to an intake passage 8 which, like a surge tank, has no enlarged volume chamber and to an exhaust passage 20 with which the cylinders $5a$ to $5f$ are communicated through respective exhaust ports 21.

The intake passage 8 includes first and second communicating passages 10 and 11. The cylinders 5a, 5c and 5e in the left cylinder banks 1a are connected to the first communicating passage 10 through respective discrete intake passages 9 which open to the cylinders through intake ports 9a, whereby the cylinders 5a, 5c and 5e are communicated with each other through the first communicating passage 10. The cylinders 5b, 5d and 5f in the right cylinder bank 1b are connected to the second communicating passage 11 through respective discrete intake passages 9 which open to the cylinders through intake ports 9a, whereby the cylinder 5b, 5d and 5f are communicated with each other through the second communicating passage 11. First and second intake air supply passages 12 and 13 are respectively connected to the first and second communicating passages 10 and 11 at the respective downstream ends. The first and second intake air supply passages 12 and 13 are merged into a common intake air supply passage 30 at the respective upstream ends. A pair of throttle valves 14 and 15 are respectively disposed in the first and second intake air supply passages 12 and 13 near the junction of the common intake air supply passage 30. An airflow meter 31 and an air cleaner 32 are disposed in the common intake air supply passage 30. The first and second communicating passages 10 and 11 are respectively defined in first and second communicating pipes 10a and 11a which are formed integrally with the cylinder heads 3 and 4, respectively, by casting, and extend in the longitudinal direction of the engine. The first and second intake air supply passages 12 and 13 are respectively defined in first and second intake air supply pipes 12a and 13a, which extend linearly in the longitudinal direction of the engine. The first and second communicating pipes 10a and 11a and the first and second intake air supply pipes 12a and 13a are accommodated in the space between the left and right cylinder banks 1a and 1b.

Figure 3:
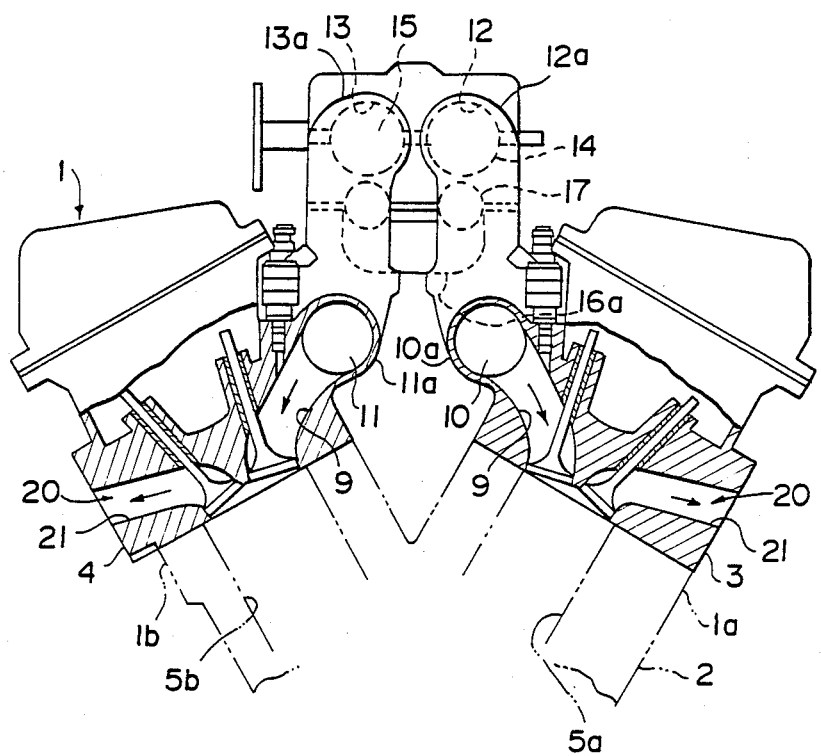
FIG. 3 is a cross-sectional view taken along line III--III in FIG. 1.
Figure 4:
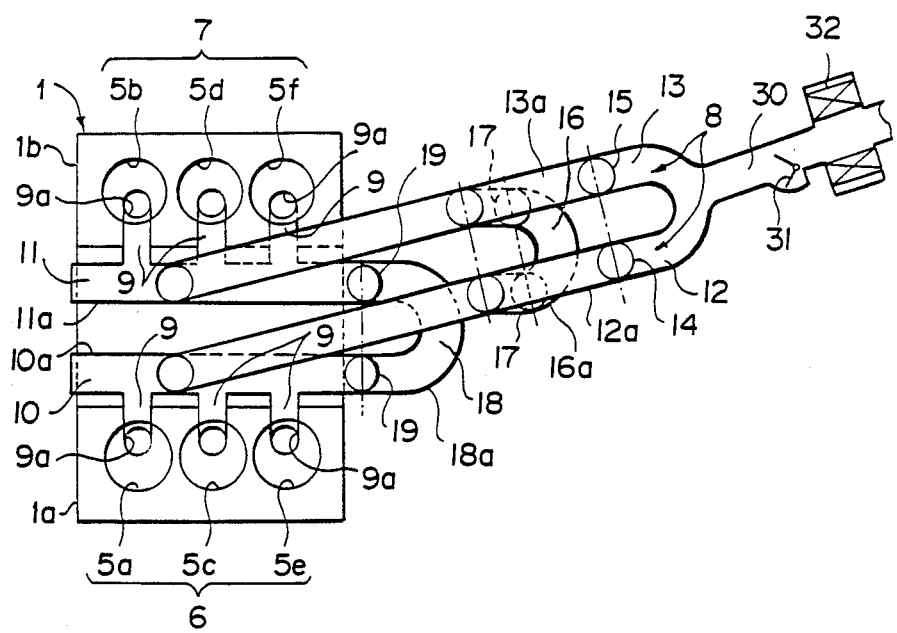
FIG. 4 is a schematic view showing the whole intake system of the engine.

The first intake air supply pipe 12a linearly extends between the left and right cylinder banks 1a and 1b, curves downward at the front end portion thereof, and is connected to the first communicating pipe 10a at a position between the junction of the first communicating pipe 10a of the discrete intake passage 9 for No.1 cylinder 5a and that of the discrete intake passage 9 for No.3 cylinder 5c. Similarly, the second intake air supply pipe 13a linearly extends between the left and right cylinder banks 1a and 1b, curves downward at the front end portion thereof, and is connected to the second communicating pipe 11a at a position between the junction of the second communicating pipe 11a of the discrete intake passage 9 for No.2 cylinder 5b and that of the discrete intake passage 9 for No.4 cylinder 5d. That is, each of the intake air supply pipes 12a and 13a is connected to the corresponding communicating pipe at a location near the front end of the communicating pipe and extends rearward The first and second communicating passages 12 and 13 are connected to each other by a third communicating passage 16 immediately downstream of the throttle valves 14 and 15. The third communicating passage 16 is defined as a u-shaped third communicating pipe 16a which is disposed below the first and second intake air supply pipes 12a and 13a and extends in a vertical plane with the right portion directed downward (FIGS. 2 and 3). A pair of first switching valves (butterfly valves in this particular embodiment) 17 are provided in the third communicating passage 16 respectively at the junctions of the third communicating passage 16 with the first and second intake air supply passages 12 and 13 to selectively communicate the first and second intake air supply passages 12 and 13 with each other or break the communication therebetween. Further, the first and second communicating passages 10 and 11 are connected with each other by a fourth communicating passage at their respective rear ends. The fourth communicating passage 18 is defined as a U-shaped fourth communicating pipe 18a which is disposed between the first and second intake air supply pipes 12a and 13a and the first and second communicating passages 10 and 11 and extends in a horizontal plane with the right portion directed forward (FIGS. 1 and 2). A pair of second switching valves (butterfly valves in this particular embodiment) 19 are provided in the fourth communicating passage 18 respectively at the junctions of the fourth communicating passage 18 with the first and second communicating passages 10 and 11 to selectively communicate the first and second communicating passages 10 and 11 with each other or break the communication therebetween.

Figure 5:
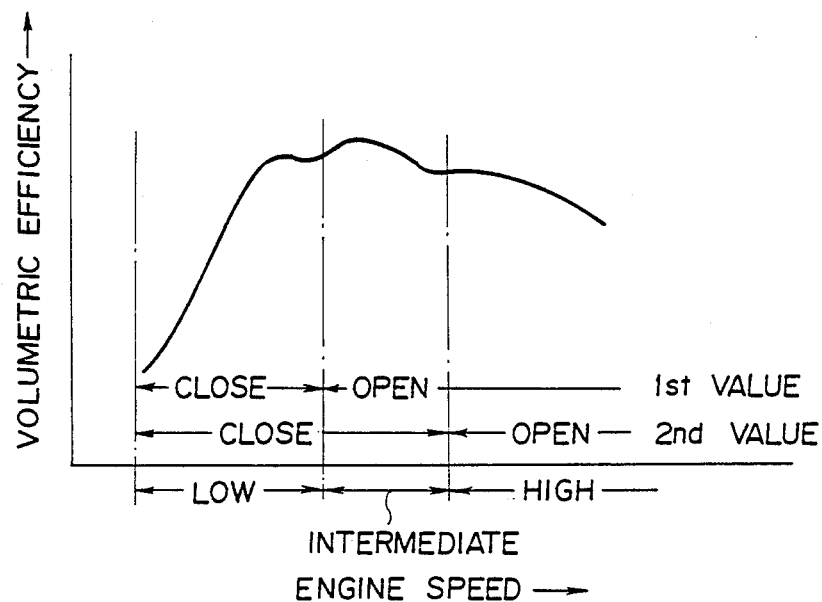
FIG. 5 shows a graph of the relation between the opening and closing of the butterfly valves and the engine speed, and a graph of the relation between the volumetric efficiency and the engine speed.

As shown in FIG. 5, when the engine speed falls within a given low range, both the first and second switching valves 17 and 19 are closed. When the engine speed falls within an intermediate engine speed range, the first switching valves 17 are opened and the second switching valves remain closed, and when the engine speed falls within a high engine speed range, both the first and second switching valves 17 and 19 are closed.

In order to arrange the engine compactly, it is important to make each discrete intake passages 9 a size which will not produce an inertia tuning effect in the working engine speed range. For this purpose, the inertia tuning engine speed $N_I$ of each discrete intake passage 9 is set to be higher than the maximum engine speed Nmax. The inertia tuning engine speed $N_I$ of each discrete intake passage 9 is represented by the following formula:

$$N_I = \theta \cdot \nu / 6,$$
wherein $$\nu = \frac{a}{2\pi} \sqrt{\frac{f}{lV_m}}$$

$\theta$ represents the intake valve opening time, $\nu$ represents the natural frequency, a represents the sonic speed, f represents the mean cross-sectional area of the discrete intake passage, l represents the mean length of the intake passage, and Vm represents the mean volume of the combustion chamber during the intake stroke.

When the engine speed falls within a low engine speed range, the switching valves 17 and 19 are closed to break the communication between the first and second intake air supply passages and between the first and second communicating passages 10 and 11. In this state, a negative pressure wave, which is generated near the intake port 9a for each cylinder in each cylinder bank at the beginning of the intake stroke of the cylinder, propagates upstream through the corresponding communicating passage (10 or 11) and the corresponding intake air supply passage (12 or 13) and is reflected as a positive pressure wave at the junction of the intake air supply passages 12 and 13. The positive pressure wave acts on the same cylinder at the end of the intake stroke to supercharge the cylinder by the inertia effect of the intake air.

When the engine speed becomes higher than a predetermined value and falls within an intermediate engine speed range, the first switching valves 17 are opened and the second switching valves 19 kept closed. When the first switching valves 17 are opened and the first and second intake air supply passages 12 and 13 are communicated with each other through the third communicating passage 16 downstream of the junction of the first and second intake air supply passages 12 and 13, a negative pressure wave, which is generated near the intake port 9a for each cylinder in each cylinder bank at the beginning of the intake stroke of the cylinder, propagates upstream through the corresponding communicating passage (10 or 11) and the corresponding intake air supply passage (12 or 13) and is reflected as a positive pressure wave at the junction of the corresponding intake air supply passage and the third communicating passage 16. Since the distance from the cylinders of the junction of the intake air supply passages 12 and 13 to the third communicating passage 16 is shorter than that of the junction of the intake air supply passages 12 and 13, the distance along which the pressure wave propagates is shortened which increases the resonant frequency of intake air. This permits the positive pressure wave to act on the cylinder at the end of the intake stroke to supercharge the cylinder by the inertia effect of the intake air in the intermediate engine speed range.

When the engine speed falls within the high engine speed range, both the first and second switching valves 17 and 19 are opened. When the first and second switching valves 17 and 19 are opened, the first and second intake air supply passages 12 and 13 are communicated with each other through the third communicating passage 16, and the first and second communicating passages 10 and 11 are communicated with each other through the fourth communicating passage 18. In this state, a positive pressure wave generated near the intake port 9a for each cylinder in each cylinder bank is propagated in opposite directions along the circular passage formed by the first and second communicating passages 10 and 11, the first and second intake air supply passages 12 and 13 and the third and fourth communicating passages 16 and 18, and acts on the intake ports for the other cylinders in the same cylinder bank, thereby supercharging the cylinders by the resonance tuning effect on the intake air.

Thus in this embodiment, the volumetric efficiency for each cylinder can be improved to increase the engine output power over a wide engine speed range from low engine speed ranges to high engine speed ranges as shown in FIG. 5.

In this embodiment, the downstream end of the first intake air supply passage 12 is connected to the first communicating passage 10 at a position between the junction of the first communicating passage 10 of the discrete intake passage 9 for No.1 cylinder 5a and the discrete intake passage 9 for No.3 cylinder 5c, and the downstream end of the second intake air supply passage 13 is connected to the second communicating passage 11 at a position between the junction of the second communicating passage 11 of the discrete intake passage 9 for No.2 cylinder 5b and the discrete intake passage 9 for No.4 cylinder 5d, and the intake air supply passages 12 and 13 extend rearward above the first and second communicating passages 10 and 11 and parallel thereto. This arrangement greatly contributes toward a compact arrangement for the whole intake system. Further, the effective length of the intake passage for each cylinder, i.e., the sum of the length of each of the first and second communicating passages 10 and 11 and the corresponding intake air supply passage, can be made sufficient to obtain an excellent supercharging effect at low engine speed ranges without substantially enlarging the overall size of the intake system.

Further, since the third communicating passage 16 is disposed below the intake air supply passages 12 and 13, and since the fourth communicating passage 18 is disposed between the first and second communicating passages 10 and 11 and the first and second intake air supply passages 12 and 13, the lengths of third and fourth communicating passages can be accommodated in relatively narrow spaces.

Further, since the communicating passages 10, 11, 16 and 18, and the intake air supply passages 12 and 13 are disposed between the cylinder banks 1a and 1b, the dead space between the cylinder banks can be efficiently utilized. Further, by forming the communicating pipes 10a and 11a (which define the first and second communicating passages 10 and 11) integrally with the cylinder heads 3 and 4, the intake system can be yet more compactly arranged.

Though, in the embodiments described above, the intake system of the present invention is applied to a V-6 engine, the intake system of the present invention may also be applied to other V-type engines.

We claim:

1. An intake system for a V-type engine having a plurality of cylinders formed in first and second cylinder banks, the firing order being set so that the cylinders in each cylinder bank do not fire one after another, in which said intake system comprises a first communicating passage which communicates the cylinders in the first cylinder bank with each other, a second communicating passage which communicates the cylinders in the second cylinder bank with each other, and a first and second intake air supply passage which are respectively connected to the first and second communicating passages characterized in that the downstream end of each of the first and second intake air supply passages is connected to the corresponding communicating passage at a position near one end of the communicating passages and each of the first and second intake air supply passages extends toward the other end of the corresponding communicating passage.

2. An intake system as defined in claim 1 in which each of said intake air supply passages extends upward from the junction to the corresponding communicating passages and is bent toward said other end of the communicating passage to extend just above the communicating passage at a predetermined distance therefrom, and a downstream side communicating passage is provided to connect said other ends of the first and second communicating passages, said downstream side communicating passage being disposed between the first and second communicating passages and the first and second intake air supply passages.

3. An intake system as defined in claim 2 in which said downstream side communicating passage is provided with a valve means which closes the downstream side communicating passage when the engine speed falls within a low range and opens it when the engine speed falls within a high range.

4. An intake system as defined in claim 1 in which the upstream ends of said intake air supply passages emerge into a common intake air supply passage provided with an air cleaner, and the intake air supply passages are communicated with each other by an upstream side communicating passage downstream of the junction with the common intake air supply passage, the upstream side communicating passage being provided with an on-off valve means, both the valve means in the downstream side communicating passage and the upstream side communicating passages being closed when the engine speed falls within a low range, the valve means in the upstream side communicating passage being opened with the valve means in the downstream side communicating passage closed when the engine speed falls within an intermediate range and both the valve means being opened when the engine speed falls within a high range.

5. An intake system as defined in claim 1 in which each of said intake air supply passages is connected to the corresponding communicating passage between the cylinder nearest to said one end of the communicating passage and the cylinder second nearest to said one end of the communicating passage.

6. An intake system as defined in claim 1 in which the upstream ends of said intake air supply passages emerge into a common intake air supply passage provided with an air cleaner, and the intake air supply passages are communicated with each other by another communicating passage downstream from the junction with the common intake air supply passage, the communicating passage being provided with an on-off valve means.

7. An intake system as defined in claim 1 in which said first and second communicating passages are formed integrally with cylinder heads in which said first and second cylinder banks are formed.

8. An intake system for a V-type engine which has a plurality of cylinders formed in first and second cylinder banks and in which the intake stroke occurs alternately in the first and second cylinder banks, the intake system characterized in that a first communicating pipe which defines a communicating passage communicating the cylinders in the first cylinder bank with each other, and a second communicating pipe, which defines a communicating passage communicating the cylinders in the second cylinder bank with each other, are formed in the space between the first and second cylinder banks, a first intake air supply pipe which defines a first intake air supply passage connected to the first communicating passage extends upward from one end portion of the first communicating pipe and turns toward the other end of the first communicating pipe to extend in the direction of the cylinder row just above the first communicating pipe and at a predetermined distance therefrom, a second intake air supply pipe which defines a second intake air supply passage connected to the second communicating passage extends upward from one end portion of the second communicating pipe and turns toward the other end of the second communicating pipe to extend in the direction of the cylinder row just above the second communicating pipe and at a predetermined distance therefrom, the upstream ends of the first and second intake air supply pipes merge into a single intake air supply pipe connected to an air cleaner, and said other ends of the first and second communicating pipes are connected with each other by a third communicating pipe which defines a third communicating passage communicating the first and second communicating passages with each other.

* * * * *